United States Patent
Meese-Marktscheffel et al.

(10) Patent No.: US 6,936,090 B2
(45) Date of Patent: Aug. 30, 2005

(54) PROCESS FOR ISOLATING RHENIUM

(75) Inventors: Juliane Meese-Marktscheffel, Goslar (DE); Viktor Stoller, Bad Harzburg (DE); Armin Olbrich, Seesen (DE); Wolfgang Mathy, Langelsheim (DE); Michael Erb, Salzgitter (DE)

(73) Assignee: H. C. Starck GmbH, Goslar (DE)

( * ) Notice: Subject to any disclaimer, the term of this patent is extended or adjusted under 35 U.S.C. 154(b) by 302 days.

(21) Appl. No.: 10/288,908

(22) Filed: Nov. 6, 2002

(65) Prior Publication Data

US 2003/0089202 A1 May 15, 2003

(30) Foreign Application Priority Data

Nov. 9, 2001 (DE) ......................................... 101 55 237

(51) Int. Cl.$^7$ ................................................ C22B 3/24
(52) U.S. Cl. ......................................... 75/711; 423/49
(58) Field of Search .............................. 75/711; 423/49

(56) References Cited

U.S. PATENT DOCUMENTS

| | | | |
|---|---|---|---|
| 2,876,065 A | 3/1959 | Zimmerley et al. | |
| 2,945,743 A | 7/1960 | Zimmerley et al. | |
| 3,244,475 A | 4/1966 | Churchward | |
| 3,458,277 A | 7/1969 | Platzke et al. | 23/22 |
| 3,558,268 A | 1/1971 | Prater et al. | |
| 3,672,874 A | 6/1972 | Wiley | |
| 3,733,388 A | 5/1973 | Ziegler | |
| 3,984,478 A | * 10/1976 | Homeier | 568/455 |
| 4,557,906 A | 12/1985 | Douglas et al. | 423/49 |
| 5,116,415 A | * 5/1992 | Rinehart | 75/711 |

FOREIGN PATENT DOCUMENTS

| | | |
|---|---|---|
| DE | 155 825 | 7/1982 |
| DE | 260 227 | 9/1988 |
| GB | 2 005 651 | 4/1979 |
| GB | 2 009 119 | 6/1979 |
| PL | 124 799 | 2/1983 |
| SU | 163 359 | 7/1963 |
| SU | 193 724 | 3/1967 |

OTHER PUBLICATIONS

R.N. Platzke and D.D. Harbuck "Improved Rhenium Recovery From Molybdenum Concentrates", Proceeding of the Second International Symposium on Metallurgical Processes for the Year 2000 and Beyond and the 1994 TMS Extraction and Process Metallurgy Meeting, San Diego, California.

* cited by examiner

*Primary Examiner*—Melvyn Andrews
(74) *Attorney, Agent, or Firm*—Joseph C. Gil; James R. Franks

(57) ABSTRACT

A process for elution of rhenium adsorbed on strongly basic ion-exchange resins by means of highly concentrated aqueous hydrochloric acid solution is described, in which the ion-exchange resin is treated with aqueous solution containing an oxidizing agent.

10 Claims, No Drawings

PROCESS FOR ISOLATING RHENIUM

CROSS REFERENCE TO RELATED PATENT APPLICATION

The present patent application claims the right of priority under 35 U.S.C. §119 (a)–(d) of German Patent Application No. 101 55 237.8, filed Nov. 9, 2001.

FIELD OF THE INVENTION

The present invention relates to a process for isolating rhenium by adsorption on strongly basic ion exchangers, and in particular to a process for eluting rhenium adsorbed on strongly basic anion exchangers.

BACKGROUND OF THE INVENTION

No proper minerals of the rare element rhenium are yet known. Instead, it occurs as a minor element in molybdenite or as traces in columbite, gadolinite and some manganese, platinum and uranium ores. The largest amount of Re is isolated by processing the roasting gases from molybdenum and copper production, although recycling of Re from secondary raw materials containing rhenium, for example, spent catalysts, is also possible.

As a rule, solutions containing rhenium which are contaminated with other elements are ultimately obtained, and are subsequently enriched by means of ion exchange, extraction, precipitation crystallisation or electrolysis and processed. As ion exchangers, U.S. Pat. Nos. 2,876,065 and 3,672,874 recommend the use of strongly basic anion exchangers, as does U.S. Pat. No. 3,733,388. The aforementioned U.S. Pat. No. 2,876,065 teaches bringing the Re solution, still containing Mo and other impurities (such as As and Se), into contact with a strongly basic anion exchanger after a pre-purification stage, in which case Mo as well as, for example, As and Se are also taken up besides Re. The molybdenum, together with the impurities, are therefore first alkalinically released, and only after a washing step is the rhenium remaining on the exchanger eluted by means of dilute solutions of strong mineral acids (HCl, $H_2SO_4$, $HNO_3$ and $HClO_4$), perchloric acid being presented as the most effective of those mentioned. Disadvantages in this case, however, are that the eluted Re product, perrhenic acid, is obtained as a mixture with perchloric acid and further elaborate separating processes therefor are necessary. The presence of perchloric acid places stringent requirements on safety standards and on material properties of the equipment which is used; moreover the perchlorate thereof becomes bound almost irreversibly to the anion exchanger during the elution step. This means that the exchanger cannot be reused with full capacity (substitution after a few sorption-elution cycles). U.S. Pat. No. 2,945,743 and SU patent 163 359 also propose the use of strong mineral acids as eluents.

SU patent 193 724 describes a hydrazine solution (8% strength) as eluent in order to improve the ability to regenerate the anionic exchanger, although the desorbed perrhenate needs to undergo an additional extractive purification step (treatment with tributyl phosphate). At the same time, the technical handling of hydrazine is found to be relatively demanding.

Other patents, such as U.S. Pat. No. 3,558,268 and DE-A 1 808 707, use an aqueous thiocyanate solution as eluent. The use of thiocyanate itself is problematic in environmental terms. A particular disadvantage is that only thiocyanates with significant water solubility can be used, and their solubility in water must be higher than that of the corresponding perrhenates (when both salts are present in solution).

A favourable perrhenate-electrolyte ratio is achieved by DD 260 227 A1 through the use, as eluent, of mixtures of a nitric or hydrochloric acid electrolyte and an organic solvent which is miscible with aqueous solutions, such as those from the group of ketones, or alcohols. The use of organic reagents with the associated problem of handling/hazard potential/disposal/etc. constitutes as much of a disadvantage in this variant as the low yield of rhenium does.

A number of prior publications concentrate on Re elution with the use of hydrohalic acids, preferably aqueous hydrochloric acids. Illustratively, DE 28 36 641 A1, DE 28 36 632 A1 and DD 155 825 use preferably 4 to 8 M hydrochloric acid at elevated temperatures (50–100° C.) as the basic operation for Re elution from strongly basic anion exchangers. They, however, show comparatively high residual Re contents on the exchanger materials, and hence low Re yields, and also—owing to the elevated operating temperatures—short exchanger lives. DD 155 825 describes pure hydrochloric acid elution, which is associated with the aforementioned disadvantages, with circulation of the hydrochloric acid and, therefore, combined perrhenate crystallisation in the bottom fraction.

It is an object of the present invention to provide a process which avoids the disadvantages of the known processes. In particular, it is an object of the present invention to extend the life of ion exchangers, that is to say the cycle number for regeneration of ion exchangers. It is a further object of the present invention to increase the elution level and therefore the loading/discharge capacity of ion exchangers.

SUMMARY OF THE INVENTION

The invention is based on the process, which is known per se, of treating solutions containing rhenium with strongly basic anion-exchange resins, thereby adsorbing the rhenium on the exchange resin, eluting the adsorbed rhenium with concentrated inorganic aqueous acids and isolating the rhenium from the eluate in a reusable form by a suitable processing.

The present invention relates to a process for elution of rhenium adsorbed on strongly basic ion-exchange resins with highly concentrated aqueous hydrochloric acid solution, which is characterised in that the ion-exchange resin is treated with an aqueous solution containing an oxidizing agent.

DETAILED DESCRIPTION OF THE INVENTION

The invention is described hereunder in more details with particular reference to the preferred embodiments. Hydrogen peroxide, in particular, is suitable as the oxidizing agent. Advantageously, an aqueous hydrogen peroxide solution which contains from 0.05 to 4%, particularly preferably from 2 to 3.5%, of hydrogen peroxide is used.

Peroxydisulphate is furthermore suitable as the oxidizing agent.

The hydrochloric acid solution may have a concentration of from 8 to 12 mol/l, preferably from 9 to 10 mol/l, of hydrogen chloride.

The treatment with the oxidizing agent ensures that the rhenium is present entirely in the heptavalent form.

According to one embodiment of the invention, the oxidizing agent is added to the highly concentrated hydrochloric acid solution, advantageously at a concentration of from 0.05 to 0.25 wt. % of hydrogen peroxide.

According to a second embodiment of the invention, the laden ion exchanger is treated with oxidizing-agent solution before the contact with the eluent. Preferably, an oxidizing-agent solution which contains from 0.5 to 4 wt. % of hydrogen peroxide is used in this case.

According to a third embodiment of the invention, the elution is carried out in several stages, and the still partially laden ion exchanger is treated with oxidizing-agent solution at least before the last elution stage. Preferably, a 0.5 to 2 wt. % strength hydrogen peroxide solution is used in this case.

It is possible to achieve very low Re residual contents on the ion exchanger in this way, even without employing elevated temperatures which put stress on the ion-exchange resin.

According to a preferred embodiment of the invention, the ion exchanger is pre-treated with oxidizing agent and also an oxidizing agent is added to the highly concentrated hydrochloric acid used for the elution. A further reduction of the Re residual content on the ion exchanger can be achieved in this way.

According to a further preferred embodiment of the invention, the elution is carried out in at least two stages with hydrochloric acid containing oxidizing agent, an intermediate treatment of the still partially laden exchange resin with aqueous oxidizing-agent solution being carried out between the elution stages. It has been found that elution levels in excess of 99% can be achieved in this way. A more than two-stage elution is generally unnecessary. The elution level can be increased further by additional pre-treatment before the first elution stage.

It has been found that, owing to the elution process according to the invention, the loading capacity is not impaired even in the event of multiple, repeated loading of the ion-exchange resin.

In an industrial ion-exchange process, one or more ion-exchange columns are respectively provided for the different process stages, and these perform the different process stages cyclically in succession. In this case, at least two ion-exchange columns are operated in the process stage of elution, because the eluent flows successively through both columns; after complete elution of the first anion-exchange column through which the eluent flows, the second ion-exchange column is connected as the first elution stage and a last stage with laden ion exchanger is connected up. According to the invention, a treatment with oxidizing-agent solution is respectively carried out before the changeover, the eluent preferably containing an oxidizing agent.

In general, it is sufficient to carry out the elution in two stages, that is to say by using two ion-exchange columns connected in series.

The eluate is advantageously concentrated by distillation, rhenium being enriched in the distillation bottom fraction. The hydrogen chloride distilled off is advantageously condensed and recovered as eluent.

The invention is further illustrated but is not intended to be limited by the following examples in which all parts and percentages are by weight unless otherwise specified.

EXAMPLES

Example 1

A laboratory ion-exchange column with an internal diameter of 32 mm, which contains 300 ml of a strongly basic anion-exchange resin, is loaded with rhenium from wash liquor from molybdenum sulphide roasting. The resin contains 9.81 wt. % of rhenium, calculated in terms of the dry exchange resin. The column is treated with one litre of 3% strength hydrogen peroxide solution. Elution is then carried out with 2 litres of 9 molar hydrochloric acid solution at a rate of 200 ml/h. After elution, re-washing with fully deionised water and drying, the ion-exchange resin still contains 0.29 wt. % of rhenium, corresponding to an elution level of 97.3%.

Example 2

Example 1 is repeated, with the difference that 9 molar hydrochloric acid with 0.12 wt. % of hydrogen peroxide is used as eluent. An elution level of 98.4% is achieved.

Example 3

Example 1 is repeated, but without pre-treating the exchange resin with hydrogen peroxide solution. The 9 molar hydrochloric acid solution contains 0.1 wt. % of $H_2O_2$. An elution level of 97.2% is achieved.

Example 4

Example 3 is repeated, with the difference that, half-way through, the elution is interrupted and the resin is treated with 0.5 litre of 1.5 wt. % strength hydrogen peroxide solution, then the elution is continued. An elution level of 99.1% is achieved.

Example 5

Example 4 is repeated, but with the pre-treatment as in Example 1. An elution level of 99.5% is achieved.

Example 6

Example 5 is repeated, with the difference that the ion exchanger is loaded with rhenium-containing wash solutions from industrial copper production. The ion exchanger has a rhenium content of 25.07 wt. %, expressed in terms of the dry resin. An elution level of 99.8% is achieved.

Example 7

Example 5 is repeated, with the difference that the ion exchanger is loaded with tungsten- and rhenium-containing strongly basic liquors from scrap recycling. The ion exchanger contains 35.53 wt. % of rhenium, expressed in terms of the dry resin. An elution level of 99.9% is achieved.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for isolating rhenium comprising:
   (a) providing a strongly basic ion exchange resin, said strongly basic ion exchange resin having a loading capacity;
   (b) absorbing rhenium onto said strongly basic ion exchange resin;
   (c) eluting absorbed rhenium from said strongly basic ion exchange resin with a highly concentrated aqueous hydrochloric acid solution, thereby forming an eluate comprising rhenium; and
   (d) isolating rhenium from said eluate, wherein said strongly basic ion-exchange resin is treated with an aqueous solution containing an oxidizing agent, further wherein the loading capacity of said strongly basic ion exchange resin is not impaired by said process.

2. The process of claim 1, wherein said oxidizing agent comprises hydrogen peroxide.

3. The process of claim 2, wherein said aqueous solution containing said oxidizing agent comprises a 0.05 to 4% strength hydrogen peroxide solution.

4. The process of claim 1, wherein said highly concentrated aqueous hydrochloric acid solution of the elution step (c) is an 8 to 12 molar hydrochloric acid solution.

5. The process of claim 1, wherein said highly concentrated aqueous hydrochloric acid solution, of the elution step (c), comprises said aqueous solution containing said oxidizing agent.

6. The process of claim 1, wherein said strongly basic ion-exchange resin is treated with said aqueous solution containing said oxidizing agent after the absorption step (b) and before the elution step (c).

7. The process of claim 1, wherein the elution step (b) is carried out in several stages, and an intermediate treatment of said strongly basic ion-exchange resin with said aqueous solution containing said oxidizing agent solution is performed before the last of said several elution stages.

8. The process of claim 5, wherein said highly concentrated aqueous hydrochloric acid solution comprises from 0.05 to 0.25 wt. % of dissolved hydrogen peroxide.

9. The process of claim 1, wherein said aqueous solution containing said oxidizing agent comprises from 0.5 to 3.5 wt. % of hydrogen peroxide.

10. The process of claim 1, wherein isolation step (d) comprises,
  (i) concentrating the eluate by distilling said eluate, thereby forming an eluent comprising condensed hydrogen chloride, and a distillation bottom fraction comprising rhenium,
  (ii) collecting rhenium from said distillation bottom fraction, and
  (iii) processing further the rhenium collected from said distillation bottom fraction.

* * * * *